US012684305B2

(12) United States Patent
Hillborg

(10) Patent No.: US 12,684,305 B2
(45) Date of Patent: Jul. 14, 2026

(54) MANAGED AUDIO DISTRIBUTION IN A VIRTUAL ENVIRONMENT

(71) Applicant: International Business Machines Corporation, Armonk, NY (US)

(72) Inventor: Mikael Hillborg, Umeå (SE)

(73) Assignee: International Business Machines Corporation, Armonk, NY (US)

( * ) Notice: Subject to any disclaimer, the term of this patent is extended or adjusted under 35 U.S.C. 154(b) by 188 days.

(21) Appl. No.: 18/645,632

(22) Filed: Apr. 25, 2024

(65) Prior Publication Data

US 2025/0301276 A1 Sep. 25, 2025

(30) Foreign Application Priority Data

Mar. 20, 2024 (GB) ...................................... 2403999

(51) Int. Cl.
*H04S 7/00* (2006.01)

(52) U.S. Cl.
CPC .............. *H04S 7/303* (2013.01); *H04S 7/307* (2013.01); *H04S 2400/11* (2013.01); *H04S 2400/13* (2013.01)

(58) Field of Classification Search
CPC ...... H04S 7/303; H04S 7/307; H04S 2400/11; H04S 2400/13; G06F 3/165
See application file for complete search history.

(56) References Cited

U.S. PATENT DOCUMENTS

2017/0195816 A1 7/2017 Shih
2018/0109902 A1 4/2018 Jin
2019/0289418 A1 9/2019 Jang
2021/0192802 A1 6/2021 Nepveu et al.
2022/0086588 A1 3/2022 Terentiv
2023/0017111 A1* 1/2023 Chhabra ................. H04S 3/008
(Continued)

FOREIGN PATENT DOCUMENTS

CN 110335516 A 10/2019

OTHER PUBLICATIONS

Intellectual Property Office, "Combined Search and Examination Report under Sections 17 and 18(3)", Dec. 19, 2024, 7 Pages, GB Application No. 2403999.2.
(Continued)

*Primary Examiner* — James K Mooney
(74) *Attorney, Agent, or Firm* — Edward J. Wixted, III

(57) ABSTRACT

In an approach, a processor, for each object: determines a closest oscillator, subscribes to receive, from the object, an audio data stream with an embedded data structure inserted at a rate determined by the closest oscillator, by a user, wherein the user is associated with a device and the avatar, determines a first distance from the object to the avatar, creates the embedded data structure based on the first distance, the embedded data structure comprising a set of audio parameters, streams the audio data stream with the embedded data structure to the device, and processes the audio data stream at the device according to the embedded data structure to determine a processed audio data stream. A processor mixes a set of processed audio data streams from each of the set of objects to determine a resulting audio data stream. A processor plays the resulting audio data stream at the device.

20 Claims, 7 Drawing Sheets

(56) References Cited

U.S. PATENT DOCUMENTS

2023/0239645 A1 7/2023 Hotta

OTHER PUBLICATIONS

IBM, Response to United Kingdom Intellectual Property Patents Act 1977: Action before search dated Sep. 4, 2024, UK Patent Application No. 2403999.2, Sep. 25, 2024, 6 pages.

Jot, et al., "Rendering Spatial Sound for Interoperable Experiences in the Audio Metaverse", arXiv:2109.12471v1 [cs.SD] Sep. 26, 2021, IEEE, https://ieeexplore.ieee.org/abstract/document/9610971, pp. 1-15.

* cited by examiner

MANAGED AUDIO DISTRIBUTION IN A VIRTUAL ENVIRONMENT

BACKGROUND

Embodiments of the invention are generally directed to virtual environments. In particular embodiments provide a method, system, computer program product, and computer program suitable for managing audio distribution in a virtual environment.

A metaverse is a network of three dimensional (3D) virtual worlds online environment in which human users, each represented by an avatar, interact with each other's avatars in virtual spaces. Avatars can also interact with software agents in the virtual space. An example is Second Life®. Other examples are in on-line gaming. Users are represented by avatars of themselves. Other virtual worlds are representations of the physical world.

3D virtual worlds can also be used to extend human understanding of the real world. The term Augmented Reality (AR) is used for technologies that mix virtual with real worlds. One type is 'optical see through', for example, Microsoft® HoloLens, which is an Augmented Reality/Mixed Reality (MR) headset. Another type is 'video see through', for example, Apple® Arkit®. Microsoft is a trademark of Microsoft Corporation in the United States, other countries, or both. Apple and Arkit are trademarks of Apple Inc., registered in the U.S. and other countries and regions. AR changes the sense of reality by superimposing virtual objects on the real world in real time.

In contrast, the term Virtual Reality (VR) is used to create a new virtual world.

In recent years, attention has also focused on economic and scientific research applications. For example, engineers can be trained to carry out tasks in a hostile environment, by first interacting with a virtual simulation of that hostile environment. Similarly, doctors can be trained to carry out operations initially in a virtual simulation of a real operating theatre.

Managing sound in 3D virtual worlds is important for the user experience. As one of the principal senses, proper sound perception is essential. This is particularly so in VR, as information carried in sound can aid perception when visual object recognition is ambiguous. Sound in VR works through a combination of techniques aimed at simulating realistic auditory environments.

In a metaverse, there might be hundreds and even thousands of audio sources which must be distributed to all users. For example, a fair or another type of event which includes a thousand attendees and several additional sound sources. These must be distributed to each user and each user should obtain a different cognitive impression of the sound because sound perception is dependent on where that user is located.

To provide an accurate experience as it would in the real world, sounds sources cannot be considered with respect to a distance threshold and then removed. Sounds should still be audible although they are far away. Known solutions threshold sounds and discard them if they are not close to the user. The result is synthetic and not very representative of how audio is emitted and experienced.

Therefore, there is a need in the art to address the aforementioned problem.

SUMMARY

According to the present invention there are provided a method, a system, and a computer program product according to the independent claims.

Viewed from a first aspect, the present invention provides a computer implemented method for managing the distribution of audio data streams in a virtual environment, the virtual environment comprising an avatar, and a set of objects, each object comprising an audio data stream, the method comprising: for each object: determining a closest oscillator; subscribing to receive, from the object, an audio data stream with an embedded data structure inserted at a rate determined by the closest oscillator, by a first user, wherein the first user is associated with a device and the avatar; determining a first distance from the object to the avatar; creating the embedded data structure based on the first distance, the embedded data structure comprising a set of audio parameters; streaming the audio data stream with the embedded data structure to the device; and processing the audio data stream at the device according to the embedded data structure to determine a processed audio data stream; mixing a set of processed audio data streams from each of the set of objects to determine a resulting audio data stream; and playing the resulting audio data stream at the device.

Viewed from a further aspect, the present invention provides a computer implemented system for managing the distribution of audio data streams in a virtual environment, the virtual environment comprising an avatar, and a set of objects, each object comprising an audio data stream, the system comprising: for each object: a server agent for determining a closest oscillator; a subscribe component for subscribing to receive, from the object, an audio data stream with an embedded data structure inserted at a rate determined by the closest oscillator, by a first user, wherein the first user is associated with a device and the avatar; a distance component for determining a first distance from the object to the avatar; a create component for creating the embedded data structure based on the first distance, the embedded data structure comprising a set of audio parameters; a stream agent component for streaming the audio data stream with the embedded data structure to the device; and a process component for processing the audio data stream at the device according to the embedded data structure to determine a processed audio data stream; a mix component for mixing a set of processed audio data streams from each of the set of objects to determine a resulting audio data stream; and a play component for playing the resulting audio data stream at the device.

Viewed from a further aspect, the present invention provides a computer program product for managing the distribution of audio data streams in a virtual environment, the computer program product comprising a computer readable storage medium readable by a processing circuit and storing instructions for execution by the processing circuit for performing a method for performing the steps of the invention.

Viewed from a further aspect, the present invention provides a computer program stored on a computer readable medium and loadable into the internal memory of a digital computer, comprising software code portions, when said program is run on a computer, for performing the steps of the invention.

BRIEF DESCRIPTION OF THE DRAWINGS

The present invention will now be described, by way of example only, with reference to preferred embodiments, as illustrated in the following figures.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
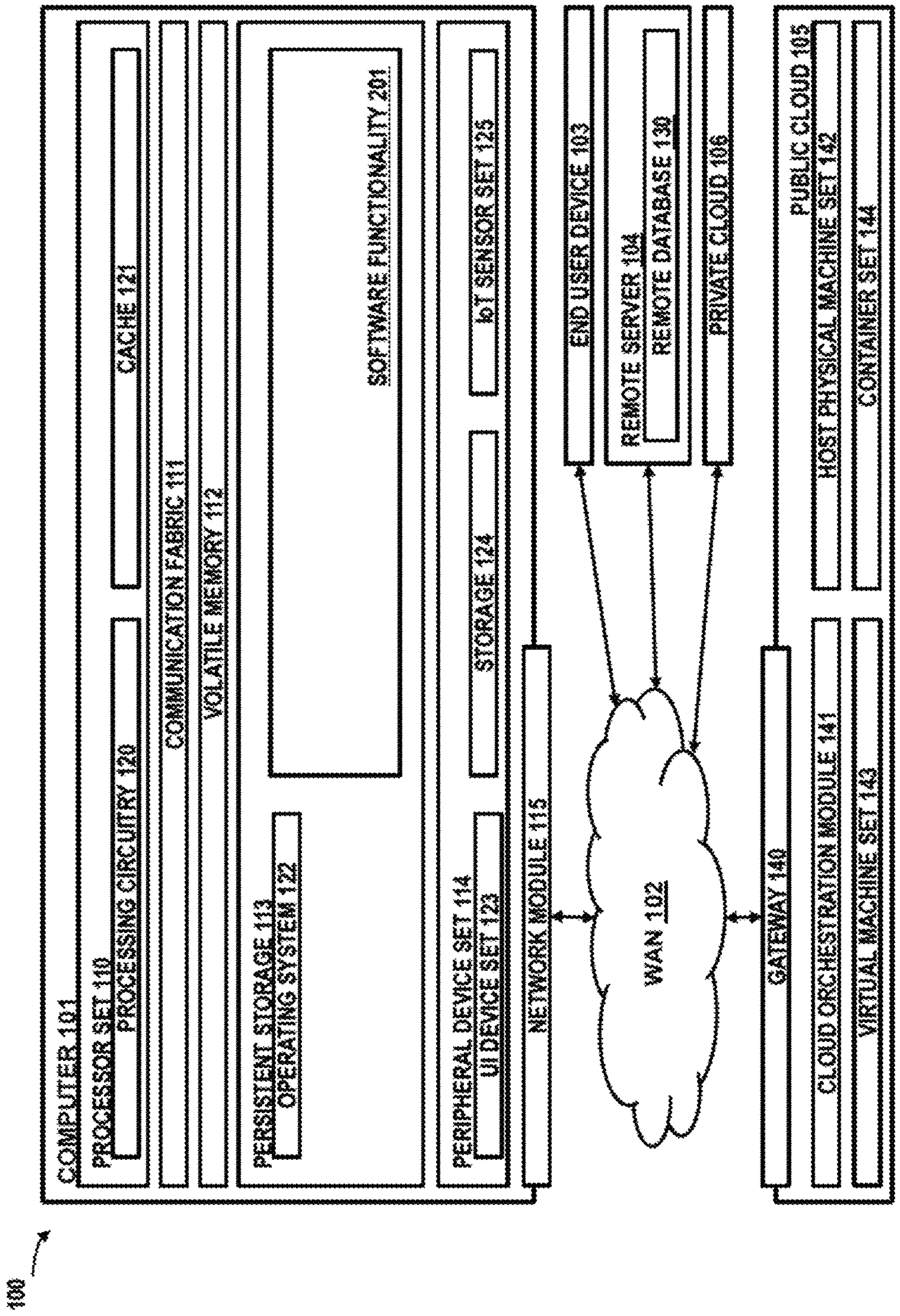
FIG. 1 depicts a computing environment, according to an embodiment of the present invention.

FIG. 1 depicts a computing environment 100. Computing environment 100 contains an example of an environment for the execution of at least some of the computer code involved in performing the inventive methods, such as software functionality 201 for an improved client 204 and improved server 218. In addition to block 201, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 201, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 201 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 201 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard disk, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers.

IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Preferably, the present invention provides a method, and system, wherein the set of audio parameters comprise at least one from a list, the list comprising: sample rate; bit resolution; and filter setting.

Preferably, the present invention provides a method, and system, wherein, in response to determining a second distance from the object to the avatar, determining a further closest oscillator; updating the embedded data structure based on the second distance; and inserting the updated embedded data structure at a rate determined by the further closest oscillator.

Preferably, the present invention provides a method, and system, wherein the virtual environment is one of a list, the list comprising: virtual reality, VR, augmented reality, AR; and mixed reality, MR.

Preferably, the present invention provides a method, and system, wherein the audio parameters are dynamic, dependent on the distance.

Preferably, the present invention provides a method, and system, wherein the filter setting comprises a cutoff frequency, CF, set to no more than a Nyquist frequency of the audio data stream, wherein CF is a non-linear function of the distance.

Preferably, the present invention provides a method, and system, further comprising sending a request to receive an audio data stream from each object within a threshold range from the avatar.

Preferably, the present invention provides a method, and system, wherein the avatar is at a first location, an object of the set of objects is at a second location, and in response to determining that the first location is different from a second location, unsubscribing from the object.

Preferably, the present invention provides a method, and system, wherein each of the first location and the second location define volumes of the virtual environment.

Advantageously, the present invention provides a more accurate representation of audio in a metaverse that doesn't discard audio elements in the environment.

Advantageously, distribution of sounds are optimized for all users present. Advantageously, only the minimum required audio data is transmitted to the client, which minimizes bandwidth.

Advantageously, the present invention reduces the bandwidth of audio emitting objects through continuous adjustment of the sample rate Rs, bit resolution Rb and a filter setting Fs. The present invention transfers a resolution specification which is updated continuously and embedded into the stream at a certain rate. Advantageously, preferred embodiments of the present invention provide optimization of bandwidth for accurate and complete audio perception using a resolution specification embedded into a dynamic audio data stream to continuously adjust sampling frequency, bit resolution Rb and filter setting Fs of audio emitting objects in metaverse rather than just truncating/thresholding objects that are far away.

Advantageously, sound is reproduced in different ways depending on how far off the object is.

Although preferred embodiments are described in the context of a virtual reality (VR) environment, the skilled person will understand that the present invention also applies to other models of digital representations, such as AR and MR.

For the benefit of illustration, the following terms will be used.

A user refers to a human interacting with the VR environment. A client refers to the user's hardware/software system. An avatar is a virtual, digital representation of the user in the VR environment on a display of the user's client.

VR uses a number of sound techniques, such as Spatial Audio. Spatial audio aims to replicate how sound behaves in the real world. This involves simulating the direction, distance, and movement of sound sources relative to the user's position. Spatial audio techniques include: Binaural Audio; Head-Related Transfer Functions (HRTFs); Real-Time Rendering; Environmental Effects (for example, the sounds of busy city streets, or running water); Interactive Sound Design (for example, footsteps of moving user); and Integration with Visuals (for example, matching footsteps with associated animations).

Sample frequency (also known as sampling frequency) determines the rate at which a continuous audio signal is converted into a discrete digital representation and represents the number of samples captured per second.

To digitize analog audio signals, a continuous waveform is sampled at regular intervals determined by the sample frequency using an analogue to digital converter (ADC). The analog signal is measured at these discrete points in time, and each sample represents the amplitude of the signal at that instant.

Using the Nyquist-Shannon sampling theorem, to accurately represent a continuous signal in digital form, the sample frequency must be at least twice the highest frequency component present in the signal. This is known as the Nyquist frequency. Therefore, the sample frequency determines the maximum frequency that can be accurately represented in the digital signal.

When a digital audio signal is played back through a digital-to-analog converter (DAC), the samples are reconstructed into a continuous waveform. The sample frequency determines the rate at which these samples are converted back into analog voltages, influencing the fidelity and accuracy of the reconstructed signal.

The sample frequency also affects the frequency response of digital audio systems. Due to the Nyquist-Shannon theorem, frequencies above half the sample rate Rs (Nyquist frequency) cannot be accurately represented and may cause aliasing effects. Therefore, the sample frequency sets the upper limit of the frequency range that can be faithfully reproduced in the digital audio signal.

Higher sample frequencies generally result in higher audio quality and resolution, as they provide more samples per second to capture the nuances of the original analog signal. However, higher sample rate also requires more storage space and computational resources.

Bit resolution Rb in digital audio refers to the number of bits used to represent each sample of an audio signal. Bit resolution Rb determines the dynamic range, resolution, and precision of the digital audio signal, by specifying the number of quantization levels available to represent the amplitude of the signal. Bit resolution Rb is typically expressed as the number of bits per sample and is often referred to as the audio's "bit depth." A higher bit depth allows for a greater dynamic range and more precise representation of the original analog signal. For example, a 16-bit audio signal has 16 bits per sample, allowing for 65,536 quantization levels.

Bit resolution Rb directly impacts the dynamic range of the digital audio signal. The dynamic range is the ratio between the loudest and quietest parts of the audio signal. A higher bit resolution Rb allows for a greater dynamic range because it provides more discrete amplitude levels to represent the signal's varying loudness levels.

Bit resolution Rb also affects the precision with which the amplitude of the audio signal can be represented. With a higher bit resolution Rb, the quantization levels (the discrete steps between minimum and maximum amplitude values) are smaller, resulting in finer detail and more accurate representation of the original analog signal.

Quantization noise refers to the error introduced when the continuous analog signal is quantized into discrete digital values. Higher bit resolutions result in smaller quantization errors and lower quantization noise, improving the signal-to-noise ratio and overall audio quality.

Higher bit resolution generally leads to higher perceived audio quality, as they allow for more accurate representation of the audio signal's dynamic range and nuances. However, the audible difference between different bit resolutions may vary depending on factors such as the quality of the audio equipment and the listener's sensitivity.

Common sample frequencies/bit resolutions used in digital audio include 44.1 kHz/16-bit (CD quality), 48 kHz/24-bit (standard for digital video and audio production), 96 kHz/32-bit (high-resolution audio). The choice of sample frequency/bit rate depends on factors such as the intended application, desired audio quality, and compatibility with other audio equipment and standards.

The bit rate of a digital audio signal refers to the number of bits processed or transmitted per unit of time, typically expressed in bits per second (bps) or kilobits per second (kbps). In digital audio, the bit rate is influenced by factors such as the bit depth, sample rate Rs, and the number of audio channels (mono vs. stereo, etc.). In uncompressed audio formats, bit rate is calculated by multiplying the sample rate Rs (in Hz) by the bit depth (in bits per sample) and the number of channels (e.g., mono=1, stereo=2).

In compressed audio formats, bit rate is typically specified as the average number of bits used to represent one second of audio data after compression.

The 'cutoff frequency' of a filter is the frequency at which the magnitude response of a filter is reduced by a certain level compared to its passband or peak magnitude. This level is typically defined as the half-power point, where the magnitude is decreased by −3 decibels (dB), or approximately 70.7% of the peak value.

The cutoff frequency is a critical parameter because it determines the transition between the passband (where the filter allows signals to pass with little attenuation) and the stopband (where the filter attenuates signals). In a low-pass filter, the cutoff frequency is the point beyond which higher frequencies are attenuated, while lower frequencies are allowed to pass. In a high-pass filter, the cutoff frequency is the point beyond which lower frequencies are attenuated, while higher frequencies are allowed to pass. In a band-pass filter, there are two cutoff frequencies: the lower cutoff frequency, and the upper cutoff frequency. These frequencies define the range of frequencies that are allowed to pass through the filter.

The specific definition of the cutoff frequency may vary depending on the type of filter and the design parameters chosen. Additionally, the term "cutoff frequency" can also be used in other contexts, such as in the context of signal analysis, where it refers to the highest frequency of interest in a signal or a system.

In analog systems, the cut-off frequency typically refers to the frequency at which a filter attenuates the signal by a certain amount, often −3 dB. However, in digital audio, filters are implemented using digital signal processing techniques, and the cut-off frequency is determined by the design of the digital filter. There are various types of digital filters used in audio processing, such as finite impulse response (FIR) filters and infinite impulse response (IIR) filters. Each type of filter has its own characteristics and methods for specifying the cut-off frequency.

The bandwidth of a digital audio signal is the range of frequencies that can be accurately represented or transmitted by the digital audio system. It is typically defined as the difference between the highest and lowest frequencies present in the audio signal.

Bandwidth is influenced by several factors in digital audio systems, including the sample rate Rs and the bit depth. As a consequence of the Nyquist-Shannon theorem, the bandwidth is limited by the sample rate Rs, extending from 0 Hz (DC) up to the Nyquist frequency.

For example, using the example values discussed above, in high-resolution audio with a sample rate Rs of 96 kHz, the Nyquist frequency is 48 kHz, so the bandwidth is 0 Hz to 48 kHz.

Additionally, the bit depth of a digital audio system affects its ability to accurately represent dynamic range, which indirectly influences the perceived bandwidth. Higher bit depths allow for more precise representation of amplitude levels, which can contribute to better resolution in the frequency domain and potentially extend the effective bandwidth of the system.

Bandwidth in digital audio refers to the frequency range that can be accurately represented or transmitted by a digital audio system and is influenced by factors such as the sample rate Rs and bit depth.

One common method of generating sound in VR is modal synthesis. Modal synthesis is a technique used in digital signal processing and computer music synthesis to simulate the sound of vibrating objects or systems, such as musical instruments or mechanical structures, by modelling their modes of vibration. In this method, the vibration of the object is represented by a set of vibrational modes, each with its own frequency, damping factor, and shape.

In modal synthesis, the sound of a complex vibrating object is decomposed into its individual vibrational modes and then the sound is synthesized by independently controlling each mode. This allows for a detailed and flexible synthesis of realistic and physically accurate sounds, making it particularly useful for simulating resonant systems.

Modal synthesis is commonly used in various applications, including virtual acoustic instruments, sound design for film and video games, and physical modelling synthesis in electronic music production. It offers a powerful and versatile approach to generating a wide range of sounds with realistic and expressive qualities.

Embodiments of the present invention optimize the distribution of audio data streams in a metaverse by using nodes in the environment, the nodes comprising low frequency oscillators (LFOs) that specify the characteristics of the environment in terms of how often the rate of individual objects can be updated, each object emitting an audio data stream with an embedded specification that adheres to the rate, the specification carrying a set of audio properties. An avatar, representing a user, switches to a new node (LFO) in the environment as the avatar moves in 3D space, affecting the stream and the specification of the audio emitting objects.

Embodiments of the present invention measures the distance between the object and the avatar. Audio is emitted from an object using a dynamic sample rate Rs, and a dynamic precision (bit resolution Rb). A lowpass filter is applied to the object, with the cutoff frequency (CF) set to no more than the Nyquist frequency, where CF is a non-linear function of the distance to the object.

Along with the emitted audio data stream, a “resolution specification” is transferred at a rate which is controlled by the appropriate LFO. The resolution specification is a data structure. The rate of the low frequency oscillator can be updated to cope with dynamic environments and events where sudden changes need to be captured correctly. For example, an event which includes many moving objects requires an update rate that is faster than a conference call.

The further away an object is from a user, the less bandwidth emitted audio needs to occupy. That is because a high sample rate Rs for objects that are far away is not required, they should only be noticeable in the distance, thus frequency content of such sounds can be filtered. Neither does the accuracy need to be high, so the number of bits (resolution) are reduced too. This mirrors real life; the farther away an object is, the more emitted sound is filtered by the surroundings.

In practice, an avatar in a VR environment will receive audio signals from multiple sources, which will need to be mixed according to the spatial and dynamic arrangement of object audio elements. Such mixing will involve the spatial audio techniques referred to above.

In a typical metaverse environment, users connect to a central server or a network of servers (herein referred to as the server) that host the virtual world using a multi-client multi-object (MCMO) model. This model supports multiple clients interacting with the same virtual environment, where each client 204 can interact with multiple objects simultaneously. The server acts as a central authority for managing and synchronizing the actions and movements of all users within the virtual space. Each user's device (such as a computer, VR headset, or mobile device) continuously sends positional and movement data to the server. This data includes information about the user's position, orientation, velocity, and actions within the virtual environment. The server receives positional data from all connected users and processes this information in real-time. The server broadcasts updates to all other users in the virtual space, ensuring that the world view of all users remains consistent and synchronized. A networking infrastructure allows communication and interaction between multiple clients and virtual objects. The infrastructure typically includes client-server communication protocols or peer-to-peer protocols.

The server is responsible for detecting and resolving collisions between users or objects within the environment. This can also include the server carrying out simulations according to the laws of physics of interactions between objects and users. The server calculates the effects of forces, collisions, and other physical interactions based on the positional data received from users and updates the virtual environment.

The server is also responsible for authenticating users and enforcing security measures to prevent unauthorized access within the metaverse environment.

For illustration purposes, the invention will be described in the context of users interacting with client software/hardware devices (hereinto termed ‘clients’). The clients interact with servers acting as the central authority.

In a preferred embodiment of the present invention, audio is delivered using a push model following a client-initiated subscription request. The server or the object responds to the subscription by streaming or transmitting the audio data to the client, which then plays the audio through the user's audio output device (e.g., headphones, speakers). This approach allows for more efficient use of network bandwidth and resources since audio data is only transmitted as required by the client. The server or object pushes audio data to users without the need for explicit requests from the client. Objects emitting audio continuously stream or transmit audio data to users or clients within their range or field of view. As users move within the virtual environment, they automatically receive audio data from nearby objects that emit sound. This method eliminates the need for the client to identify objects and then send a request.

In a typical VR MCMO model, both server and clients play their part in controlling sound. The client usually handles audio management, including volume control based on the user's perspective and position within the virtual environment. Clients use various techniques, such as spatial audio processing algorithms, to simulate sounds realistically, including Doppler effects as objects move relative to the user. Client-side sound management allows for a more appropriate processing based on the user's hardware capabilities. Server management of audio is also essential so that audio is consistent across multiple users.

An audio data stream 706 is a never-ending stream of data, compared to a file which has a defined end. The resolution specification 702 is defined by the object 212 when the client 204 uses the object's API to subscribe on an audio data stream 706. The audio data stream 706 receives the client's ID and can look up where in the VR environment the client 204 is located relative to the audio object 212.

Preferred embodiments of the present invention will be described with reference to a virtual environment comprising a set of avatars interacting with objects within the VR environment. Multiple users 202 on respective clients 204 can interact with multiple objects 212 simultaneously. For simplicity it is assumed that one user 202 is represented by one avatar 210 on one client 204. However, the skilled person would understand that a user could control multiple avatars 210 on a single client 204. The invention will be described in the context of one client 204 interacting with one server. In practice, a VR environment comprises multiple clients 204 and multiple servers 218.

Figure 2:
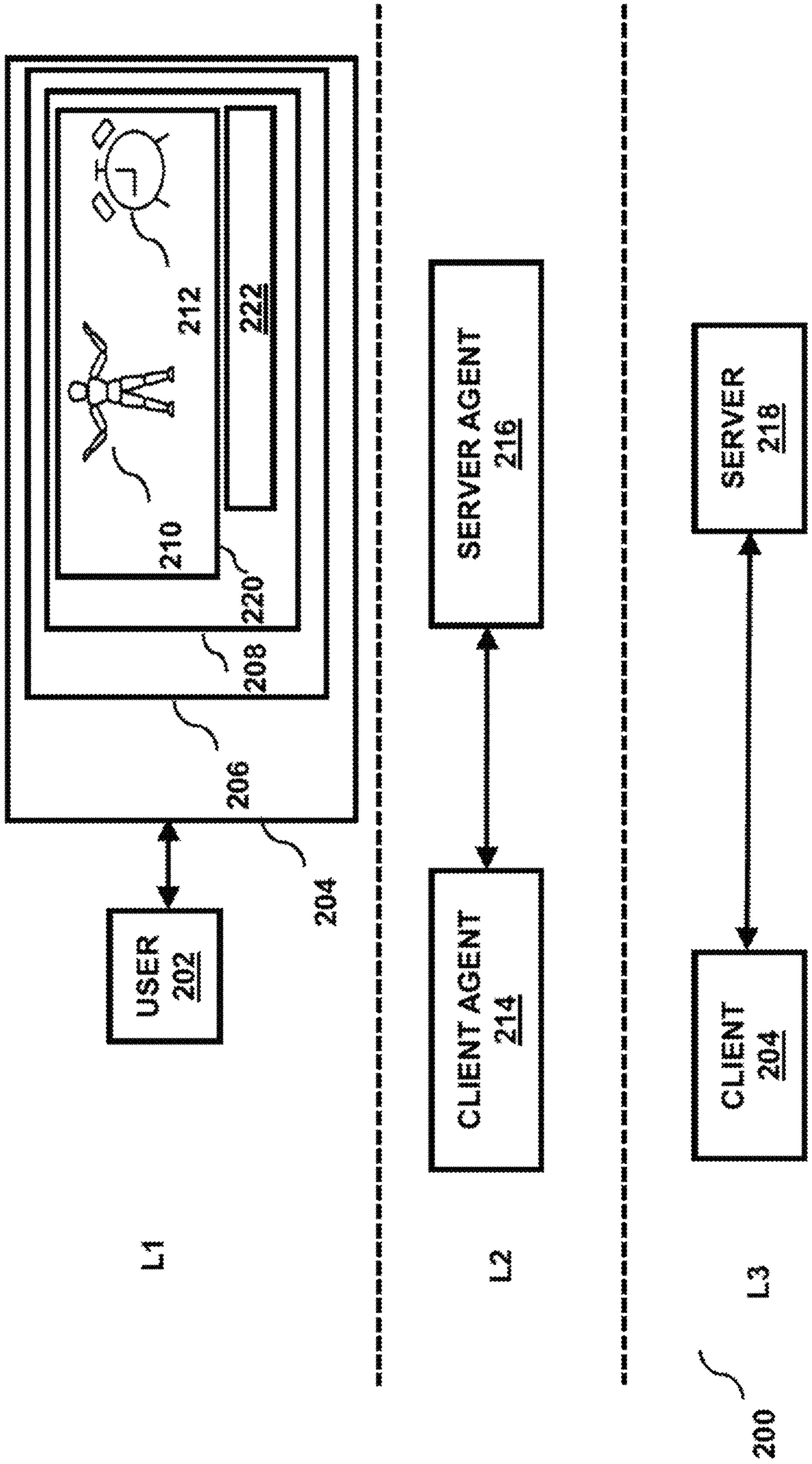
FIG. 2 depicts levels of a VR environment, according to a preferred embodiment of the present invention.
Figure 3:
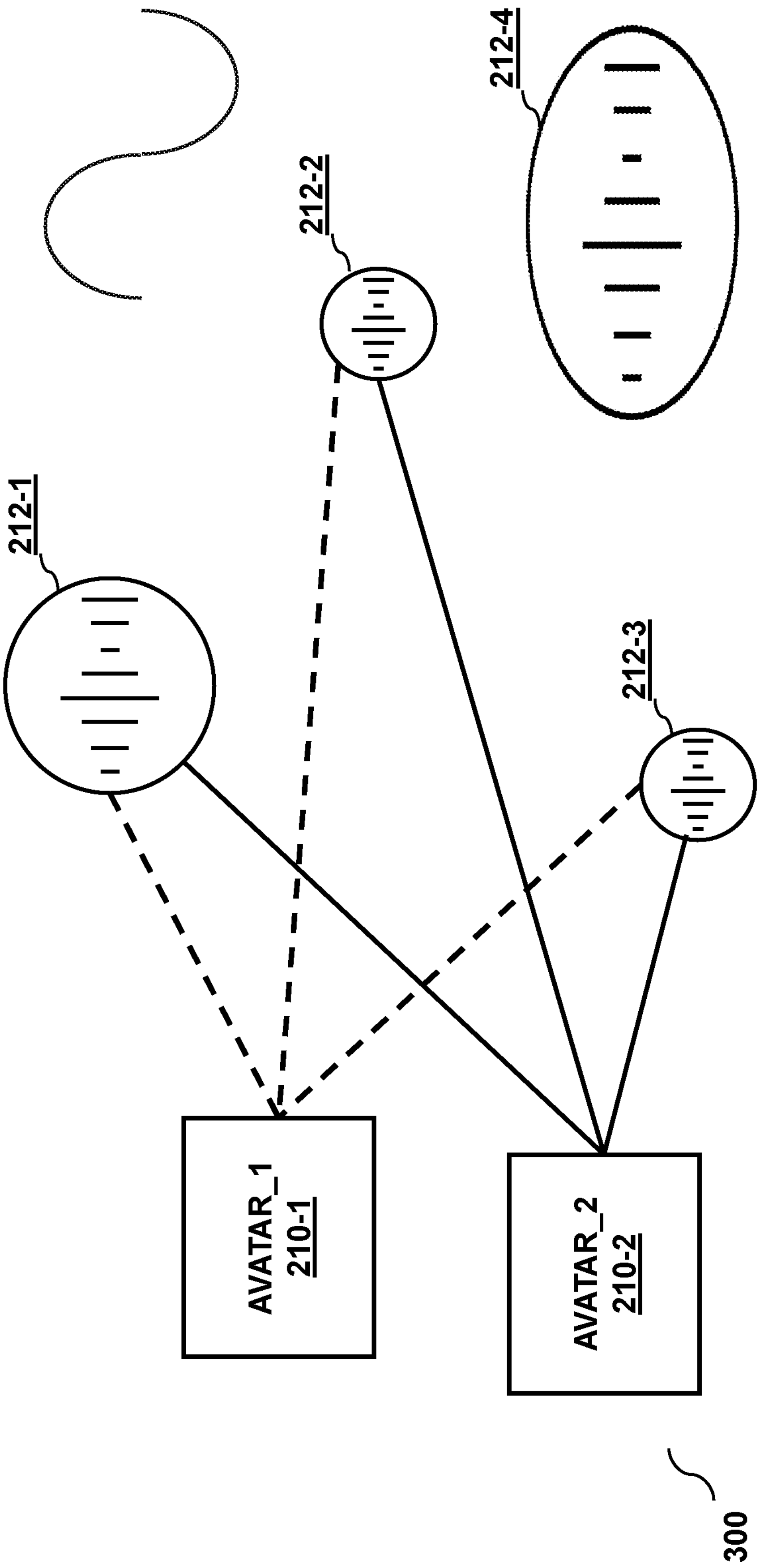
FIG. 3 depicts an exemplary VR environment, according to a preferred embodiment of the present invention.

FIG. 2 depicts levels of a VR environment 200, according to a preferred embodiment of the present invention. FIG. 3 depicts an exemplary VR environment 300, according to a preferred embodiment of the present invention.

Figure 4:
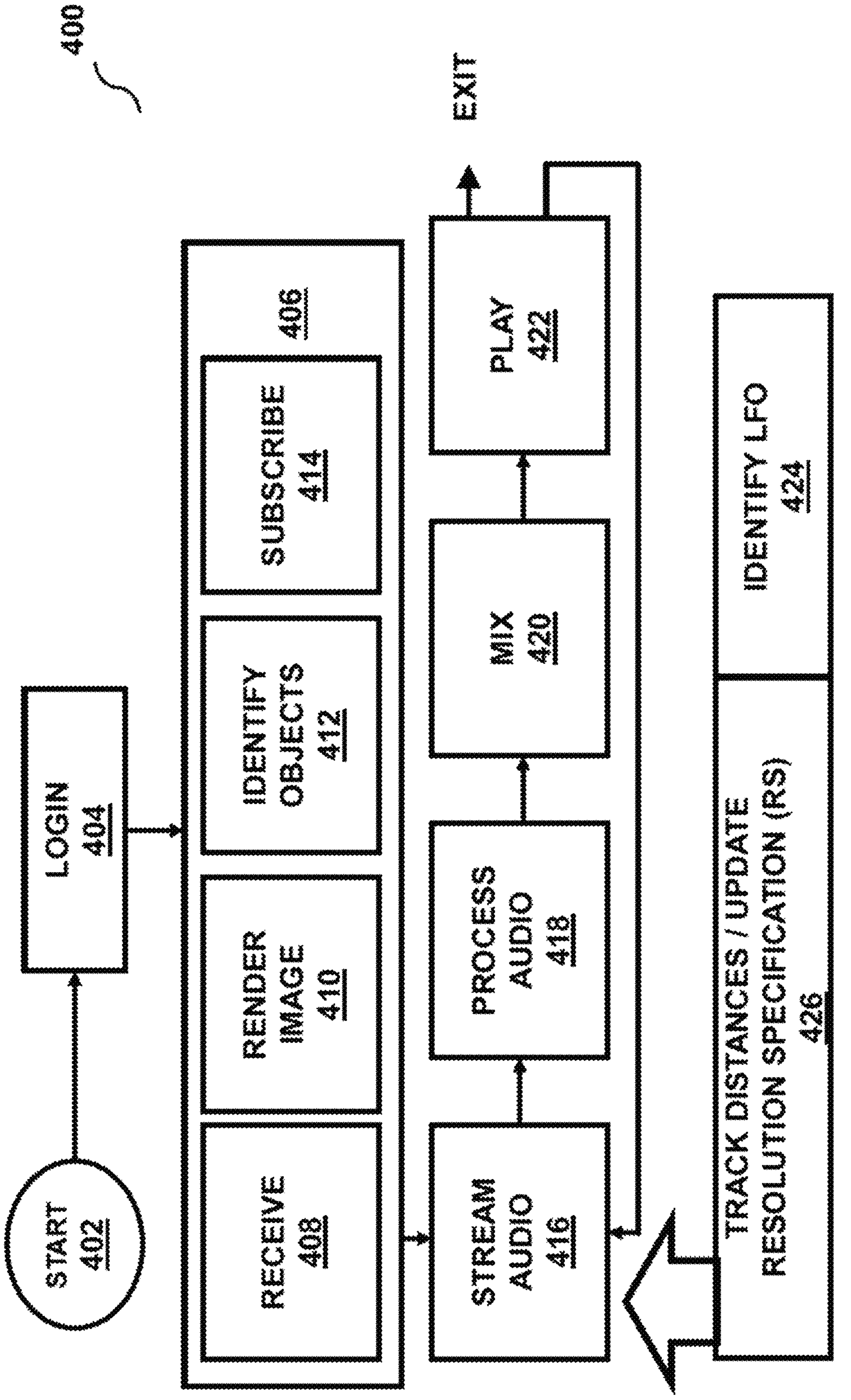
FIG. 4 depicts a high-level exemplary schematic flow diagram depicting operation client methods steps for managing audio distribution in a virtual environment, according to a preferred embodiment of the present invention.

FIG. 4, which should be read in conjunction with FIGS. 2, 3, 5 to 8, depicts a high-level exemplary schematic flow diagram of a method 400 depicting operation method steps for managing audio distribution in a virtual environment, according to a preferred embodiment of the present invention.

Figure 5:
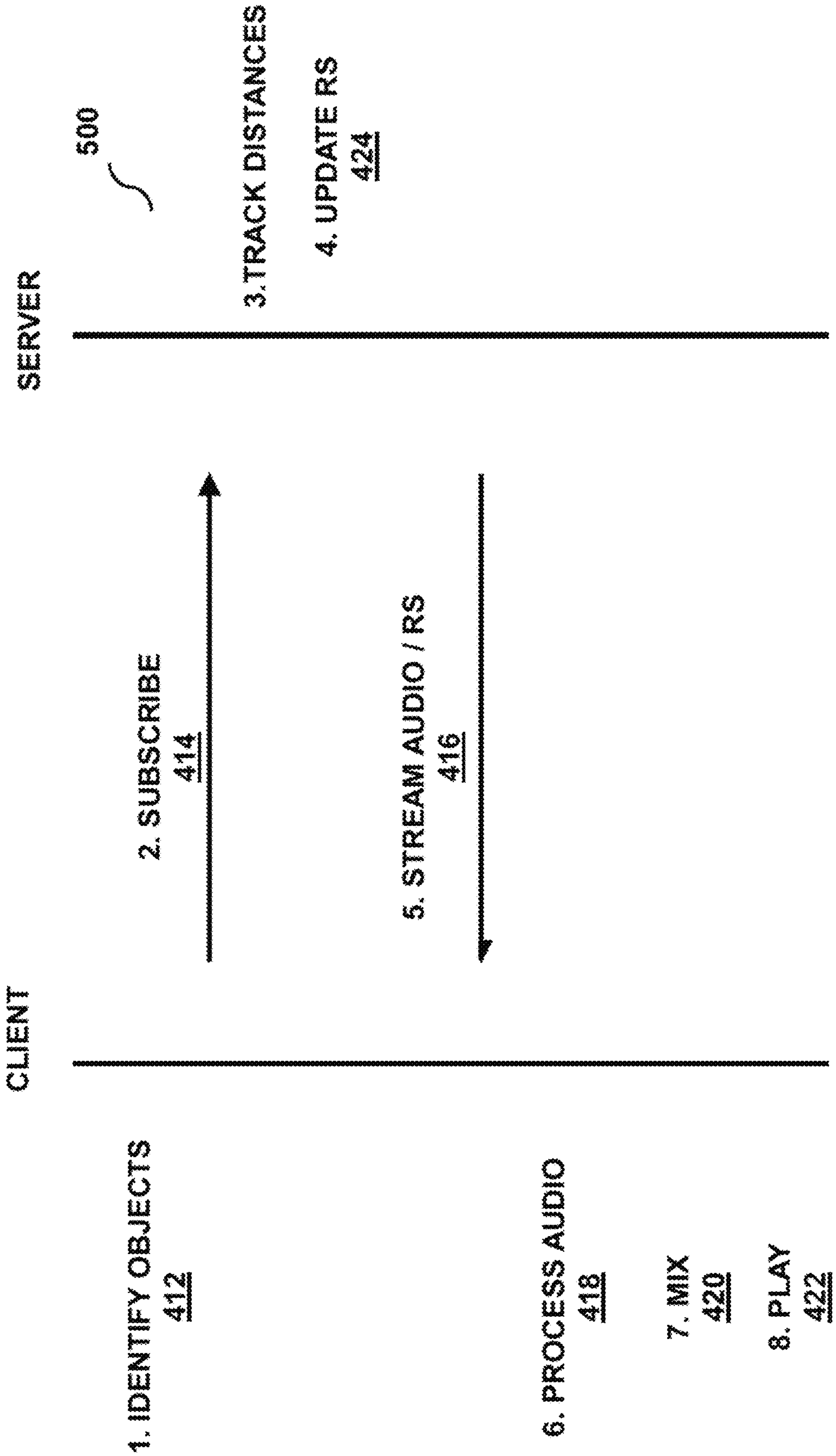
FIG. 5 also depicts a high-level exemplary schematic flow diagram depicting method steps of FIG. 4 illustrating client and server steps, according to a preferred embodiment of the present invention.

FIG. 5 also depicts a high-level exemplary schematic flow diagram 500 depicting method steps of FIG. 4 illustrating client and server steps, according to a preferred embodiment of the present invention.

Figure 6:
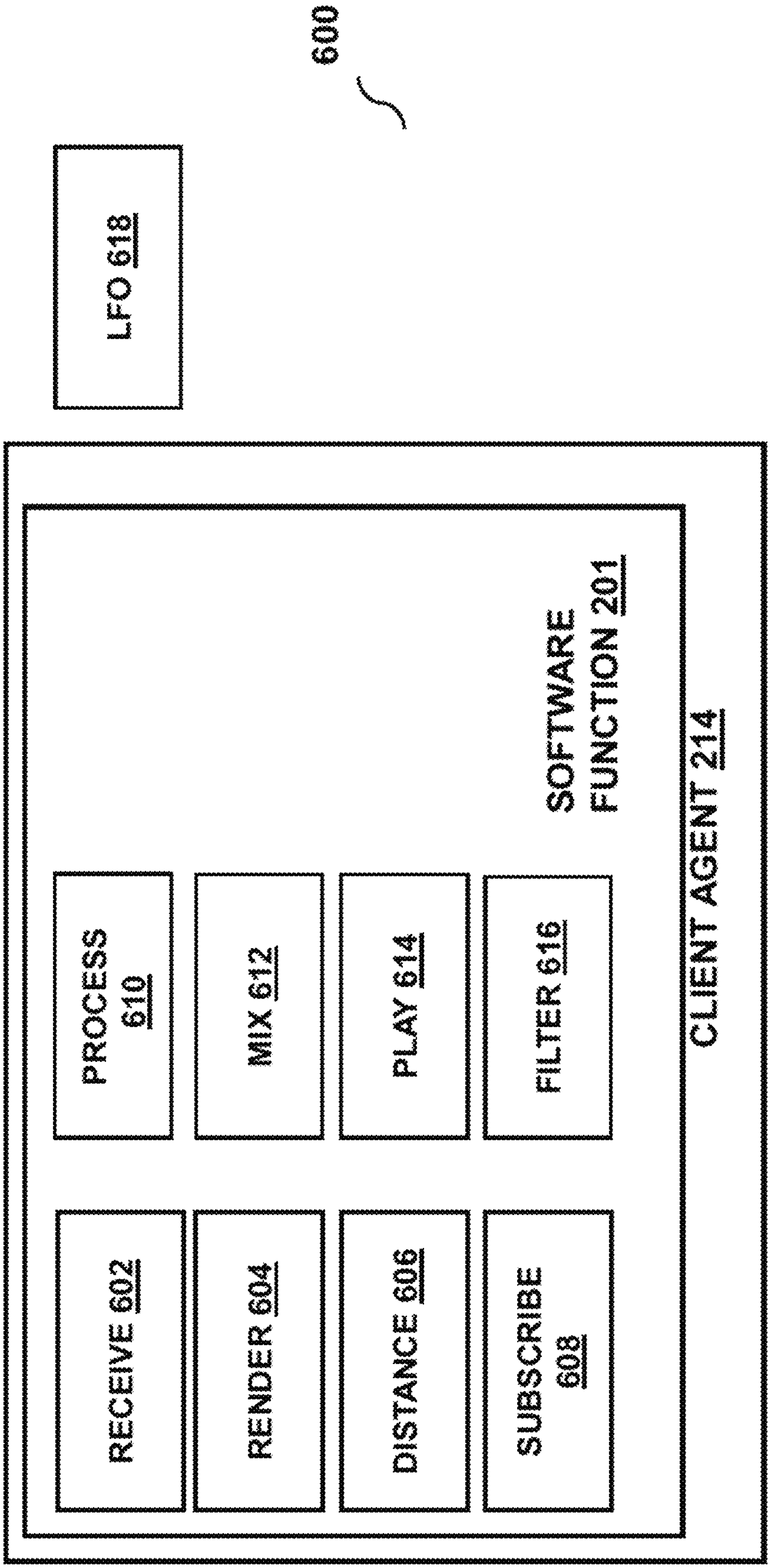
FIG. 6 depicts an exemplary schematic diagram of software elements, according to a preferred embodiment of the present invention.

FIG. 6 depicts an exemplary schematic diagram 600 of software elements, according to a preferred embodiment of the present invention.

Figure 7:
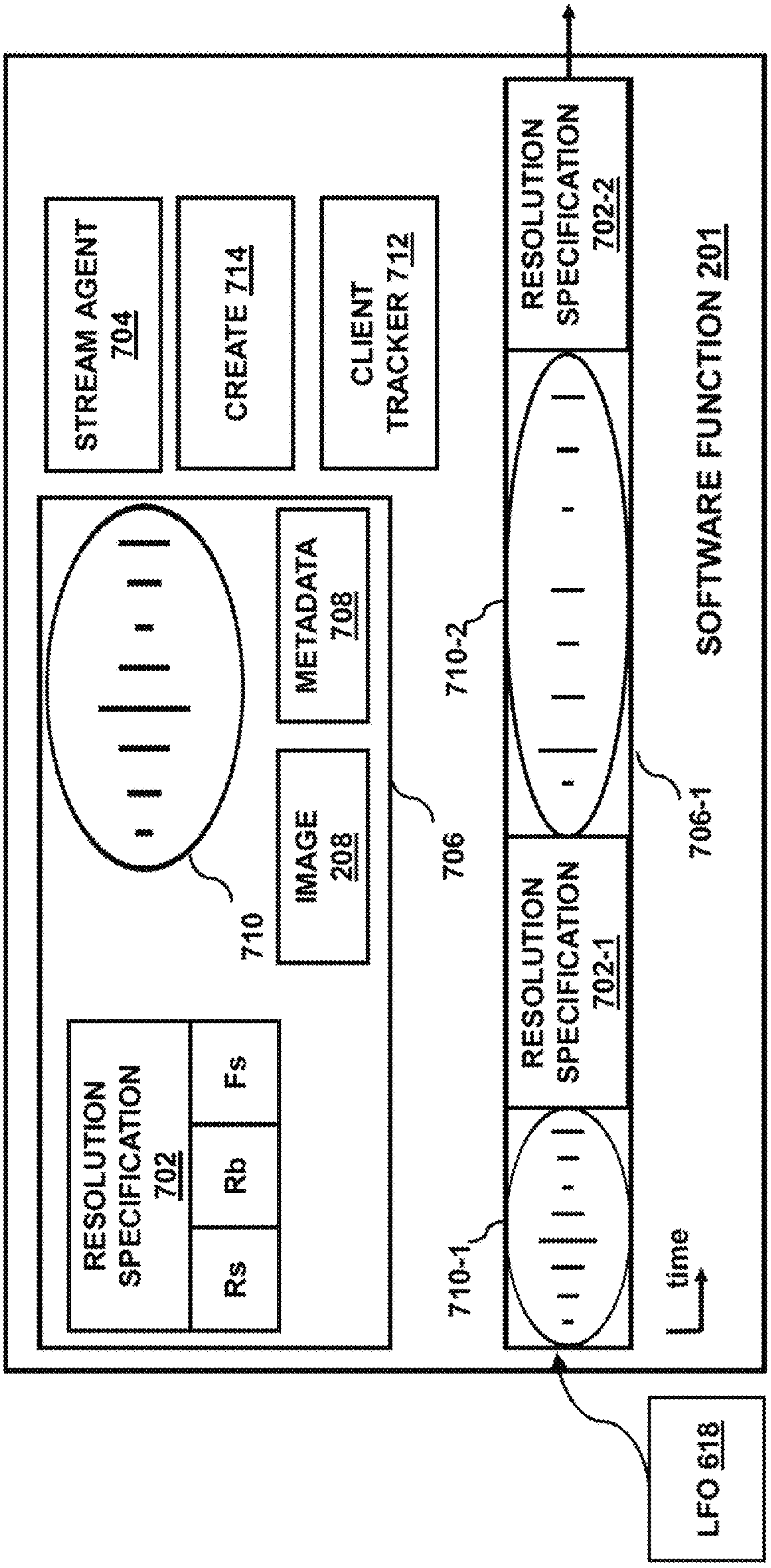
FIG. 7 depicts an exemplary schematic diagram depicting further software constructs, according to a preferred embodiment of the present invention.

FIG. 7 depicts an exemplary schematic diagram depicting further software constructs, according to a preferred embodiment of the present invention. FIG. 7 comprises software components 704, 712, 714 of software functionality 201. FIG. 7 also comprises elements of an audio data stream 706, and time illustration of an audio data stream 706-1. For clarity purposes audio data stream 706-1 does not depict changing images 208 and metadata 708.

FIG. 2 depicts levels of a VR environment (also known as a VR, AR, MR 'world'), In a VR environment there are a number of logical/physical levels. At the highest level (not depicted), there is the VR environment itself. At a first level L1, a user interacts with the VR environment using a client 204 and displays an image 208 of the VR environment on a display 206 of the client 204. For simplicity, FIG. 4 depicts one avatar 210 and a clock object 212. The user 202 controls the avatar 210. The avatar 210 and the clock object 212 are in a first location 220 of the virtual environment. Such a location 220, 222 are also known as 'rooms' of the VR environment. Also depicted is a second location 222. Although the VR environment is depicted in two dimensions, VR environments may also be defined in three dimensions.

At a second level L2, a client agent 214 running on the client 204 interacts with a server agent 216 typically running on a server 218. The client agent 214 manages interactions that the user 202 has with the VR environment, as well as interacting with the server agent 216 that acts as the central authority discussed above. At a third level L3, the client 204 interact with the server 218.

Preferred embodiments will be described with reference to a 'sound' coming from the object 212 and being received by the avatar 210. The skilled person will understand that underlying this are interactions between a client agent 214, and a server agent 216, and between a client 204 and the server 218. A 'sound' apparently coming from an object is, in reality, a first audio data stream being transmitted from the server 218 to the client 204, processed on the client 204 and played though the sound device (for example, headphones, speakers, etc.) of the client 204, as an analogue signal. The sound device plays the sound by translating a second audio file by transmission of waves in some medium, such as air or water. The user 202 senses the energy waves and interprets them as the sound. The first audio file and the same audio file may be the same, or different if the client 204 manipulates the first audio file.

FIG. 3 depicts a VR environment. The VR environment comprises two avatars, avatar_1 210-1, and avatar_2 210-2. The VR environment also comprises four objects 212 that can act as sound sources. Object_1 212-1 issues human speech, containing high quality audio. Object_2 212-2 contains high frequency noise. Object_3 212-3 contains the full frequency range. Object_4 212-4 is moving object containing mid and low frequency noise.

Referring to FIG. 4, the method starts at step 402. At step 404 a user 202 logs in using the client 204 and authenticates with the VR environment. Step 406 represents a set up step for each avatar 210. At step 406, a receive component 602 of the client 204 receives a stream of audio data stream 706 from a stream agent component 704 of the server 218 with an image 208, objects 212, and other data. The image 208 also depicts the user's avatar 210-1, and other users' respective avatars 210-2. The other users' avatars 210-2 may also act as objects 212 with respect to the user's avatar 210-1. Included in the stream of image 208 is metadata 708 for each object specifying whether the object provides audio data 710. As part of step 406, the receive component receives 408 an image 208. At step 410 a render component 604 of the client 204 renders the image 208 on the display 206 of the client 204.

At step 412, a distance component 606 of the client 204 computes how far away their avatar 210 is to all audio emitting objects 212 that are within a threshold range in the VR environment.

At step 414 a subscribe component 608 of the client 204 subscribes to each object 212-1, 212-2, 212-3, 212-4 to receive an audio data stream 706 comprising audio data 710 according to a 'resolution specification 702'. A subscription request may also comprise a set of audio parameters of the client, so that the resolution specification 702 can be appropriate. For example, if a client can only reproduce low frequencies, there is no point in sending high frequencies. A create agent 714 of the server agent 216 creates the resolution specification based on a distance between avatar and object, the distance, the resolution specification comprising a set of appropriate audio parameters.

The resolution specification 702 comprises information about the audio data 710, including, but not limited to, sample rate Rs, accuracy (bit resolution Rb) and filter setting Fs. The skilled person would understand that other audio parameters could be used. An embodiment of the invention uses a subscription based model, with events being posted to the client 204, acting as a subscriber. In this context the system works in a push mode. Each subscribed audio emitting object 212 gets an identification (ID) of the client 204 when the client 204 subscribes with the object 212, enabling the audio emitting object 212 to look up in the VR environment where the avatar 210 is located. The designer of an audio emitting object 212 provides an interface, which the client 204 uses to subscribe to audio data 710 according to a relationship that the client 204 has with the object 212. For example, if the distance is far away, there may be no need to reproduce high frequencies, etc. As part of the subscription the client 204 requests an optimum (lowest possible) sample rate Rs, bit resolution Rb and filter frequency.

For example, if there are only objects 212 that are not very close, the sample rate Rs, bit resolution Rb, and filter setting Fs can be reduced. Similarly, if there are only human objects 212 and low frequency sounds, then the sample rate Rs, bit resolution Rb, and filter setting Fs can be reduced. If they are far away, it can be reduced even more. In contrast if the avatar 210-1 is located close to an object 212 representing somebody who is, for example, playing an instrument, full fidelity might be needed.

The resolution specification 702 is embedded into the stream 706 and is updated at a certain interval. Thus, a stream 706 of audio data 710-1 is followed by a resolution specification 702-1, followed by another stream of data 710-2, followed by another resolution specification 702-2, etc. As can be seen in FIG. 7, the rate in which the embedded resolution specifications occur is controlled by the LFO 618.

When an object 212-3 moves away from the avatar 210-1 there is less need to transfer a full bandwidth audio data 710, because as the object 212-3 moves away it is naturally less audible to the avatar 210-1.

Avatar_1 210-1 is close to object_1 212-1, so Avatar_1 210-1 will subscribe to object_1 212-1 to request an audio data stream from that object_1 212-1 which has a high quality. However, object_1 212-1 doesn't need to reproduce more than, say, up to 16 kHz: object_1 212-1 is a speaker and human formants, and any noise emitted by a speaker's consonants are far below that frequency.

Avatar_1 210-1 is far away from object_4 212-4 and thus object_4 212-4 can emit audio with a lower sampling frequency and reduced bit resolution Rb, and it will use a lower filter setting for that object, to eliminate folding distortion and at the same time simulate the larger distance.

Avatar_2 210-2 is close to object_4 212-4, but since object_4 212-4 contains only mid and low frequency noise, object_4 212-4 will transmit with a low sampling frequency, low bit resolution Rb and a low filter setting. Both Avatar_1 210-1 and Avatar_2 210-2 users are far away from object_3 212-3, so although the source contains the full frequency range, it doesn't need to reproduce the full frequency range with full bit resolution Rb and the sampling frequency can be reduced and the filter setting Fs reduced.

Object_4 212-4 is a moving object and if Object_4 212-4 moves away from avatar_2 210-2, then resolution specification 702 of Object_4 212-4 will be updated accordingly as it transmits its stream to avatar_2 210-2. Object_4 212-4 is a moving object 212 so the audio data stream 706-1 needs to be updated at a reasonable rate. As object_4 212-4 has a low and mid frequency range, if it moves far away, only the low frequency range needs to be captured.

Objects 212 in the VR environment need not be visible to a user 202.

In parallel with the steps 404-422 a server method manages the VR environment. At step 424, the server agent 216 identifies LFOs 618 in the VR environment, and identifies, amongst other factors, the closest LFO 618 to each object 212. The server agent 216 will use the frequency rate from the closest LFO 618 to determine at which rate the server agent 216 will be insert the embedded data structure (that is the resolution specification) into the audio data 710. At step 426, a client tracker component 712 associated with each object 212 tracks each avatar 210-1, 210-2 in the VR environment. The client tracker component 712 calculates the distance to each avatar 210 and updates the next available slot in the audio data stream 706-1 with a resolution specification 702 that reflects the current situation. The resolution specification 702-2 is updated by the server agent 216, embedded in the audio data stream 706-1 and sent to the client 204 in the audio data stream 706.

The client tracker component 712 can also identify if the client 204 leaves a local environment, resulting in the client 204 being unsubscribed from the object 212 and halting streaming of audio data streams 706 to the client 204. Conversely, the client tracker component 712 can also identify if an object 212 leaves a local environment, resulting in the client 204 being unsubscribed from the object 212 and halting streaming of audio data streams 706 to the client 204. In both cases, a first location 220 of the client 204 is different from a second location 222 of the object 212. Locations 220, 222 can be measured with a number of granularities. For example, a location 220, 222 can define a point in the VR environment. Alternatively, a location 220, 222 can define a VR environment 'room', and so be defined as a two dimensional area, or a three dimensional volume of the VR environment.

One way of tracking in a VR environment is known as "lighthouse" tracking, developed by Valve Corporation for its HTC Vive VR system. In an immersive VR environment, two base stations emit infrared light in a specific sequence and timing, which is detected by sensors on the VR headset and controllers. To determine where the client 204 is located relative to the audio object 212, the audio object 212 can access a central repository or in multiple repositories, for example one repository per local "room", according to the architecture of the VR environment.

Continuously, the audio object 212 then obtains the ID of the client 204 and gets various properties of the client 204, for example where the client 204 is located. The object 212 streams audio data 710 to the client and the resolution specification 702 is included at an interval which is determined by the nearest LFO.

At step 416, the object 212 streams raw audio data 710 in a stream 706 to each subscribed client 204-1, 210-2, along with the resolution specification 702. The audio emitting object determines the quality at which a specific subscription will be produced.

At step 418 a process component 610 of the client 204 processes the audio data stream 706 to produce a processed audio file. The client 204 interprets what is received from the subscribed object 212. Each client 204 comprises a low pass filter 616. As part of the process step 418, the received audio data 710 is passed through the low pass filter 616 to avoid folding distortion of frequencies above the Nyquist frequency. Folding distortion occurs when frequencies above the Nyquist frequency are incorrectly represented in a digital system.

At step 420, a mix component 612 of the client 204 mixes all processed audio data streams from each object 212-1, 212-2, 212-3, and 212-4 to provide a mixed audio file. As the audio data streams 706 from each object 212-1, 212-2, 212-3, and 212-4 are being mixed by the user's node, the information flows continuously in the resolution specification 702.

At step 422 a play component 614 of the client 204 plays the mixed audio file on the sound device of the client 204. The method returns to step 416.

The method 400 processes audio data streams 706 according to steps 416-422, until the avatar 210 unsubscribes, or is unsubscribed from all objects 212.

As avatars 210-1, 210-2 move around, and come closer or farther away to/from an audio emitting object 212, the resolution specification 702 changes.

A control rate at which the resolution specification 702 is transmitted determines how quickly the VR environment can pick up sudden changes of the sound, for example an object 212 that approaches an avatar 210 very fast. Control rate is different from sample rate Rs. The audio data stream 706 contains the samples at a certain sample rate Rs, but at a regular interval, the resolution specification is inserted into the audio data stream 706. The resolution specification 702-1, 702-2 can change, as the client 204 or the audio emitting object 212 moves around in the VR environment. The rate is controlled by the LFO 618. The client 204 transmits information about the LFO to each object 212 to specify at which rate the client 204 needs to receive the resolution specification 702.

Each client can read the value of the LFO closest to its corresponding avatar. LFOs are placed in different places in the environment, so if an avatar 210 moves, for example, from one "room" to another, a new LFO can be read, which describes how rapid the updates need to be in order to capture sudden events. The filter setting Fs is just a property that is decided by the audio emitting object and used by the client to render the audio.

In an alternative embodiment, the environment is an AR environment. Sound is received from real and virtual objects. Real objects can be represented by a digital twin object. Real, analogue sounds are received from the real object at the user's client. At the client the received analogue sound is processed according to the resolution specification associated with the digital twin of the sound emitting object.

In an alternative model, clients request audio in a pull model. Alternatively, a hybrid model amalgamates elements of both push and pull models.

In an alternative embodiment audio data can be implemented as a file. Such an architecture would include input/output I/O processing. Audio information is a data structure is transferred to the client.

The skilled person would understand that there are other models. In an alternative embodiment, a client to client (also known as peer-to-peer) model is followed, where clients connect directly to each other. In another, a client can also host the environment, acting as a client as well as a server 218. In another, a hybrid model allows for client-server and client-client elements to be incorporated.

In an alternative embodiment to that depicted in FIG. 5, a different interaction model between client and server 218 is followed. For example, a responsibility for tracking distances and updating the resolution specification 702 may rest with the client. The skilled person would understand that different division of responsibilities for the steps of the method could be followed between client and server 218, or client and client (in a peer to peer model).

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein. It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above invention may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

Moreover, the same or similar reference numbers are used throughout the drawings to denote the same or similar features, elements, or structures, and thus, a detailed explanation of the same or similar features, elements, or structures will not be repeated for each of the drawings. The terms "about" or "substantially" as used herein with regard to thicknesses, widths, percentages, ranges, etc., are meant to denote being close or approximate to, but not exactly. For example, the term "about" or "substantially" as used herein implies that a small margin of error is present. Further, the terms "vertical" or "vertical direction" or "vertical height" as used herein denote a Z-direction of the Cartesian coordinates shown in the drawings, and the terms "horizontal," or "horizontal direction," or "lateral direction" as used herein denote an X-direction and/or Y-direction of the Cartesian coordinates shown in the drawings.

Additionally, the term "illustrative" is used herein to mean "serving as an example, instance or illustration." Any embodiment or design described herein is intended to be "illustrative" and is not necessarily to be construed as preferred or advantageous over other embodiments or designs.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For the avoidance of doubt, the term "comprising", as used herein throughout the description and claims is not to be construed as meaning "consisting only of".

What is claimed is:

1. A computer-implemented method comprising:

for each object in a virtual environment, wherein: (i) the virtual environment comprises an avatar and a set of objects and (ii) each object comprises an audio data stream:

determining a closest oscillator;

subscribing to receive, from the object, an audio data stream with an embedded data structure inserted at a rate determined by the closest oscillator, by a first user, wherein the first user is associated with a device and the avatar;

determining a first distance from the object to the avatar;

creating the embedded data structure based on the first distance, the embedded data structure comprising a set of audio parameters comprising bit resolution;

streaming an audio data stream with the embedded data structure to the device; and processing the audio data stream at the device according to the embedded data structure to determine a processed audio data stream;

mixing a set of processed audio data streams from each of the set of objects to determine a resulting audio data stream; and playing the resulting audio data stream at the device.

2. The computer-implemented method of claim 1, wherein the set of audio parameters further comprise a selection from the group consisting of: sample rate and filter setting.

3. The computer-implemented method of claim 2, wherein the filter setting comprises a cutoff frequency (CF), set to no more than a Nyquist frequency of the audio data stream, wherein the CF is a non-linear function of the distance.

4. The computer-implemented method of claim 1, further comprising:

responsive to determining a second distance from the object to the avatar, determining a further closest oscillator;

updating the embedded data structure based on the second distance; and inserting the updated embedded data structure at a rate determined by the further closest oscillator.

5. The computer-implemented method of claim 1 wherein the virtual environment is selected from the group consisting of: virtual reality, augmented reality, and mixed reality.

6. The computer-implemented method of claim 1 wherein the audio parameters are dynamic, dependent on the distance.

7. The computer-implemented method of claim 1, further comprising sending a request to receive an audio data stream from each object within a threshold range from the avatar.

8. The computer-implemented method of claim 1, wherein the avatar is at a first location and an object of the set of objects is at a second location, further comprising:

responsive to determining that the first location is different from a second location, unsubscribing from the object.

9. The computer-implemented method of claim 8, wherein each of the first location and the second location define volumes of the virtual environment.

10. A computer system comprising:

a processor set;

one or more computer readable storage media; and program instructions stored on by the one or more computer readable storage media to cause the processor set to perform operations comprising:

for each object in a virtual environment, wherein: (i) the virtual environment comprises an avatar and a set of objects and (ii) each object comprises an audio data stream:

determining a closest oscillator;

subscribing to receive, from the object, an audio data stream with an embedded data structure inserted at a rate determined by the closest oscillator, by a first user, wherein the first user is associated with a device and the avatar;

determining a first distance from the object to the avatar;

creating the embedded data structure based on the first distance, the embedded data structure comprising a set of audio parameters comprising bit resolution;

streaming an audio data stream with the embedded data structure to the device; and processing the audio data stream at the device according to the embedded data structure to determine a processed audio data stream;

mixing a set of processed audio data streams from each of the set of objects to determine a resulting audio data stream; and playing the resulting audio data stream at the device.

11. The computer system of claim 10, wherein the set of audio parameters further comprise a selection from the group consisting of: sample rate and filter setting.

12. The computer system of claim 11, wherein the filter setting comprises a cutoff frequency (CF), set to no more than a Nyquist frequency of the audio data stream, wherein the CF is a non-linear function of the distance.

13. The computer system of claim 10, wherein the operations further comprise:

responsive to determining a second distance from the object to the avatar, determining a further closest oscillator;

updating the embedded data structure based on the second distance; and inserting the updated embedded data structure at a rate determined by the further closest oscillator.

14. The computer system of claim 10 wherein the virtual environment is selected from the group consisting of: virtual reality, augmented reality, and mixed reality.

15. The computer system of claim 10 wherein the audio parameters are dynamic, dependent on the distance.

16. The computer system of claim 10, wherein the operations further comprise:

sending a request to receive an audio data stream from each object within a threshold range from the avatar.

17. The computer system of claim 10, wherein the avatar is at a first location and an object of the set of objects is at a second location and wherein the operations further comprise:

responsive to determining that the first location is different from a second location, unsubscribing from the object.

18. The computer system of claim 17, wherein each of the first location and the second location define volumes of the virtual environment.

19. A computer program product comprising:

one or more computer readable storage media; and program instructions stored on the one or more computer readable storage media to perform operations comprising:

for each object in a virtual environment, wherein: (i) the virtual environment comprises an avatar and a set of objects and (ii) each object comprises an audio data stream:

determining a closest oscillator;

subscribing to receive, from the object, an audio data stream with an embedded data structure inserted at a rate determined by the closest oscillator, by a first user, wherein the first user is associated with a device and the avatar;

determining a first distance from the object to the avatar;

creating the embedded data structure based on the first distance, the embedded data structure comprising a set of audio parameters comprising bit resolution;

streaming an audio data stream with the embedded data structure to the device; and processing the audio data stream at the device according to the embedded data structure to determine a processed audio data stream;

mixing a set of processed audio data streams from each of the set of objects to determine a resulting audio data stream; and playing the resulting audio data stream at the device.

20. The computer program product of claim 19, wherein the set of audio parameters further comprise a selection from the group consisting of: sample rate and filter setting.

* * * * *